No. 659,146. Patented Oct. 2, 1900.
F. D. HAYDEN.
MEASURING SCOOP OR LADLE.
(Application filed May 3, 1900.)
(No Model.)
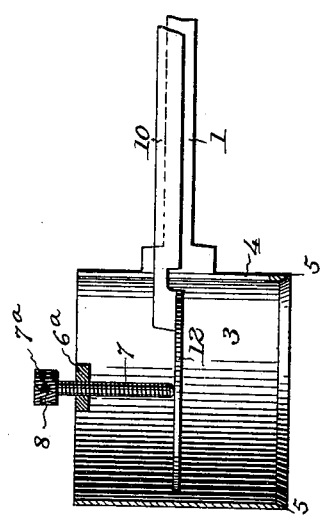
Fig. 3.
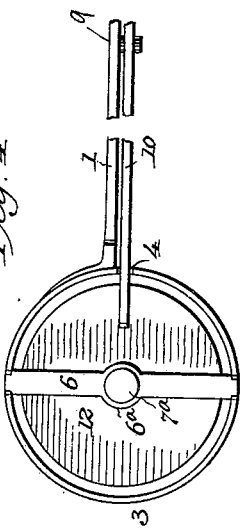
Fig. 4.
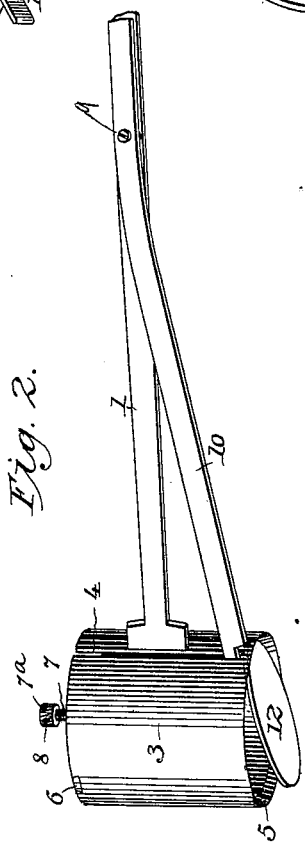
Fig. 1. Fig. 2.
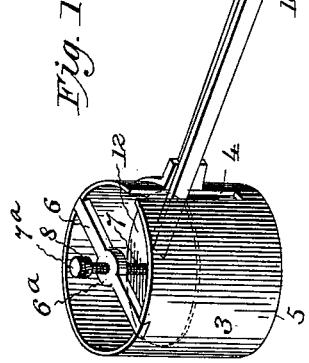
Witnesses
Sidney P. Hollingsworth
C. B. Bull
Inventor
Frank D. Hayden,
by his Attorney
THE NORRIS PETERS CO., PHOTO-LITHO., WASHINGTON, D. C.

UNITED STATES PATENT OFFICE.

FRANK D. HAYDEN, OF RICHMOND, VIRGINIA.

MEASURING SCOOP OR LADLE.

SPECIFICATION forming part of Letters Patent No. 659,146, dated October 2, 1900.

Application filed May 3, 1900. Serial No. 15,370. (No model.)

*To all whom it may concern:*

Be it known that I, FRANK D. HAYDEN, a citizen of the United States, residing at No. 1407 West Main street, Richmond, in the county of Henrico and State of Virginia, have invented a new and useful Improvement in Measuring Scoops or Ladles, of which the following is a full, clear, and exact description, reference being had to the accompanying drawings and to the numerals of reference marked thereon.

My invention relates to a device to be used more particularly in the serving of ice-cream with soda-water, and is designed to enable the operator to dip from the ice-cream freezer a predetermined amount of cream and discharge it into the glass containing the soda-water.

The invention consists in the constructions and combinations hereinafter described, and pointed out in the claim.

In the accompanying drawings, Figure 1 is a perspective view of my invention, the parts being in their normal position. Fig. 2 is a perspective view of a portion of the improvement, showing the means for discharging the cream in the position at the time of the discharge. Fig. 3 is a longitudinal section of the outer end of the device, and Fig. 4 an end view of the same.

Similar numerals of reference indicate similar parts in the respective figures.

1 is a shank having a handle 2 and an outer cylindrical head 3. The shank and handle together are of sufficient length to allow the scoop to be dipped into and to the lower part of the ice-cream freezer. The cylindrical head 3 is open at each end and provided with a slot 4 for a purpose to be hereinafter described. The operative end of the cylindrical head is sharpened or provided with a knife-edge, as shown at 5. Across the inoperative end of said head 3 is a bar 6, having a central enlargement 6ª, interiorly threaded to receive the screw 7. The screw is furnished with a milled head 7ª, the head also having a perforation 8, through which a nail or the like may be passed to give greater leverage, if required, in turning the screw.

About centrally of the length of the shank 1 is pivoted at 9 an arm or lever 10. The inner end of this arm has a bent portion or thumbhold 11 in convenient proximity to the handle 2, while to the outer end of said arm or lever, which moves in the slot 4, is secured a disk or plate plunger 12, the diameter of which is slightly less than that of the interior of the cylindrical head 3, so that the disk or plate plunger may in its movement in and out of the head have the necessary clearance. The inner end of the pivoted arm or lever 10 is normally depressed or pushed out by means of a plate-spring 13, secured to the shank 1, the outer end of the spring resting upon the arm or lever, as shown. By preference I employ the spring in two parts—a section which rests upon the arm or lever 10 and which is of thin metal and high resiliency and a shorter part of heavier metal. The use of a two-part spring, however, is obviously not essential.

The operation of my invention is as follows: The operator will first adjust the screw 7 so as to cause it to constitute a stop for the disk or plate plunger 12 at the required distance within the cylindrical head 3, so that the cup or cavity outside of the disk or plunger shall be adapted to hold the required amount of ice-cream to be served with each glass of soda-water. It being desired to dip up the cream the device is thrust into the freezer and the prescribed or predetermined amount of cream dipped out. The scoop containing the cream having been placed over the glass of soda the operator by pressing upon the thumbhold 11 will force out the disk or plate plunger and eject the ice-cream from the cylindrical head into the glass.

It is apparent that my invention, while specifically intended for the purpose above stated is applicable to other uses—in fact, wherever a predetermined amount of material is to be taken from a mass and discharged.

Having thus described my invention, I claim—

In a measuring scoop or ladle, the combination of a head rigidly secured to a shank or handle and provided with a slot, and having a cross-bar at one end interiorly threaded and furnished with an adjusting-screw, an arm or lever pivoted to the shank, the inner end of said arm or lever extending through the slotted wall of the head and being provided with a disk or plate plunger rigidly secured thereto, and a spring secured to the shank and pressing upon the outer end of said arm or lever to retract the plunger, substantially as and for the purposes set forth.

In testimony whereof I hereunto set my hand and seal.

FRANK D. HAYDEN. [L. S.]

Witnesses:
GEORGE H. HOWARD,
C. B. BULL.